United States Patent
Nagarkar et al.

(10) Patent No.: US 9,584,877 B2
(45) Date of Patent: Feb. 28, 2017

(54) LIGHT-WEIGHT VALIDATION OF NATIVE IMAGES

(75) Inventors: Pracheeti Nagarkar, Redmond, WA (US); Michael Rayhelson, Seattle, WA (US); Atsushi Kanamori, Redmond, WA (US); Fadi Hanna, Redmond, WA (US); Surupa Biswas, Bellevue, WA (US); Jan Kotas, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 13/161,607

(22) Filed: Jun. 16, 2011

(65) Prior Publication Data

US 2012/0323858 A1 Dec. 20, 2012

(51) Int. Cl.
| | |
|---|---|
| *G06F 7/00* | (2006.01) |
| *G06F 17/30* | (2006.01) |
| *H04N 21/81* | (2011.01) |
| *H04N 21/835* | (2011.01) |
| *H04N 21/84* | (2011.01) |

(52) U.S. Cl.
CPC ....... *H04N 21/8153* (2013.01); *H04N 21/835* (2013.01); *H04N 21/84* (2013.01)

(58) Field of Classification Search
CPC ......... G06F 17/30286; G06F 17/30902; G06F 17/30253; G06F 17/30401; G06F 17/30474; G06F 17/30539; G06F 17/30345; G06F 17/30289; G06F 17/30002; G06F 17/30061; G06F 12/08; G06F 15/167; G06F 17/20; G06F 9/06; H04N 21/8153; H04N 21/835; H04N 21/84

USPC .................................. 707/687, 955, 999.103
See application file for complete search history.

(56) References Cited

U.S. PATENT DOCUMENTS

| | | | |
|---|---|---|---|
| 5,640,566 A * | 6/1997 | Victor et al. .................. | 717/113 |
| 6,442,548 B1 * | 8/2002 | Balabine et al. | |
| 6,516,337 B1 * | 2/2003 | Tripp et al. ................... | 709/202 |
| 6,643,842 B2 * | 11/2003 | Angel et al. ................... | 717/130 |
| 7,039,663 B1 * | 5/2006 | Federwisch et al. | |
| 7,120,618 B2 * | 10/2006 | Ramani et al. ................ | 706/45 |
| 7,219,330 B2 * | 5/2007 | Hogg et al. ................... | 717/106 |
| 7,263,551 B2 * | 8/2007 | Belfiore .................... | G06F 9/54 |
| | | | 707/999.01 |
| 7,320,129 B2 | 1/2008 | Talwar et al. | |
| 7,590,807 B2 * | 9/2009 | McGovern et al. .......... | 711/159 |

(Continued)

OTHER PUBLICATIONS

Hoscheck, Wolfgang, "A Database for dynamic distributed content and its application for service and resource discovery". IEEE 2002.*

(Continued)

*Primary Examiner* — Daniel Kuddus
(74) *Attorney, Agent, or Firm* — Kevin Sullivan; Kate Drakos; Micky Minhas

(57) ABSTRACT

One or more identifiers that facilitate efficient native image validation can be generated and stored in an auxiliary file upon pre-compiling of an assembly. The native image can be validated against an assembly from which the native image is generated, among other files that influence the generated contents of the native image, based upon the auxiliary file and included identifiers. Additionally, native image validation can be performed in an increasing cost sequence associated with each identifier included within the auxiliary file.

17 Claims, 9 Drawing Sheets

(56) References Cited

U.S. PATENT DOCUMENTS

| | | | | |
|---|---|---|---|---|
| 7,685,178 | B2* | 3/2010 | Rajan | G06F 3/0607 707/802 |
| 7,689,933 | B1* | 3/2010 | Parsons | G06F 3/0482 715/200 |
| 7,730,468 | B1* | 6/2010 | Trowbridge | G06F 9/44547 717/139 |
| 7,810,025 | B2* | 10/2010 | Blair | G06F 17/227 715/239 |
| 2002/0062354 | A1* | 5/2002 | Suraski | G06F 17/30902 709/212 |
| 2003/0101208 | A1* | 5/2003 | Chauvel | G06F 8/4434 718/1 |
| 2004/0059748 | A1* | 3/2004 | Cox | G06F 9/465 |
| 2004/0186862 | A1* | 9/2004 | Garthwaite | G06F 12/0276 |
| 2005/0055681 | A1* | 3/2005 | Gadre | G06F 8/42 717/146 |
| 2005/0246697 | A1* | 11/2005 | Hsieh | G06F 8/447 717/151 |
| 2006/0047874 | A1* | 3/2006 | Watanabe | G06F 13/1642 710/244 |
| 2006/0047974 | A1* | 3/2006 | Alpern | G06F 9/44521 713/191 |
| 2006/0101431 | A1* | 5/2006 | Pepin et al. | 717/138 |
| 2006/0230124 | A1* | 10/2006 | Belfiore et al. | 709/219 |
| 2007/0006185 | A1* | 1/2007 | Choi et al. | 717/137 |
| 2007/0260819 | A1* | 11/2007 | Gao | G06F 12/0888 711/138 |
| 2008/0098368 | A1 | 4/2008 | Biswas et al. | |
| 2009/0282477 | A1* | 11/2009 | Chen | G06F 21/51 726/22 |
| 2009/0307430 | A1* | 12/2009 | Bruening | G06F 12/0862 711/119 |
| 2010/0095284 | A1* | 4/2010 | Herring | G06F 9/4552 717/148 |
| 2010/0251230 | A1* | 9/2010 | O'Farrell | G06F 8/61 717/173 |
| 2011/0296375 | A1* | 12/2011 | Mooney | 717/106 |
| 2011/0314072 | A1* | 12/2011 | Resch et al. | 707/827 |
| 2012/0078720 | A1* | 3/2012 | Pappas et al. | 705/14.55 |
| 2012/0102009 | A1* | 4/2012 | Peterson | G06F 17/30067 707/705 |
| 2012/0110632 | A1* | 5/2012 | Burghart | G06F 21/604 726/1 |
| 2012/0117080 | A1* | 5/2012 | Lamanna et al. | 707/747 |

OTHER PUBLICATIONS

Hoschek, "Peer-to-Peer Grid Databases for Web Service Discovery", Publshed: European Organization of Nuclear Research—2002.*

"Ngen.exe (Native Image Generator)", Retrieved at <<http://msdn.microsoft.com/en-us/library/6t9t5wcf.aspx>>, Retrieved Date: Apr. 1, 2011, pp. 14.

Biswas, Surupa, "CLR Inside Out: The Performance Benefits of NGen", Retrieved at <<http://msdn.microsoft.com/en-us/magazine/cc163610(printer).aspx>>, Retrieved Date: Apr. 1, 2011, pp. 8.

"NET Security Workshop", Retrieved at <<http://www.grimes.demon.co.uk/workshops/secWSThree.htm>>, Retrieved Date: Apr. 1, 2011, pp. 12.

Maurya, Ajeet Pratap, "Security Mechanism in .NET", Retrieved at <<http://social.nnsdn.microsoft.com/Forums/en/netfxsetup/thread/77da3319-266f-4dce-9d72-b9757f063127>>, Mar. 8, 2007, p. 1.

* cited by examiner

LIGHT-WEIGHT VALIDATION OF NATIVE IMAGES

BACKGROUND

Computer systems are driven by machine-readable instructions encoded in binary format, wherein the encoding depends on the hardware platform executing the instructions, and ultimately, according to an instruction set of a platform processor. Programs are created with computer instructions in the form of source code, wherein compilers, or other tools, convert the source code into machine-readable instructions. These tools have steadily increased in performance and sophistication as technology has advanced. As one example, a standard compiler generally operates over source code in a particular computer programming language and generates an executable image of instructions for a particular hardware platform. As program sizes and the amount of source code increases, however, the time to compile large code sources can become excessive. Thus, costs associated with developing large programs can increase as the size of the program increases for no other reason than time is expended waiting for the compiler to complete or build executable code images.

Separate compilers and subsequent compilation processes may be required for each hardware platform that a particular source program is to be executed on. For instance, a program written in C++ can employ different compilers to target specific computer architectures. In order to address compile time and re-compilation issues, other types of compilers and execution models have been developed. As an example, intermediate language compilers have been developed that convert source code written in many different languages (e.g., C++, BASIC, Pascal, and the like) to an intermediate language that operates in a virtual environment sometimes referred to as a virtual machine. Thus, the virtual machine converts the intermediate language into the particular instructions required of the platform.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to light-weight validation of native images. An auxiliary file can be created for a native image that includes one or more identifiers, such as a last modified timestamp (LMT). The auxiliary file can be created upon a generation of a native image from an assembly such that the identifiers in the auxiliary file match the identifiers in the assembly, among other files that influence the generated content of the native image. Validation with the auxiliary file can invoke an identifier specific sequence in which identifiers are employed, as needed, based upon an increasing cost such as processing time and resource utilization. Furthermore, the auxiliary file can provide native image validation independent of a system registration in accordance with one embodiment.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

An assembly can comprise code (e.g., process assemblies (.exe) or library assemblies (.dll)) including virtual instructions (e.g., intermediate language code) that are translated to create a native image with native instructions understandable by the host machine. A native image can be out-of-sync or stale when a newly installed or updated code has not been translated to create a corresponding native image. For example, code associated with assembly 1.0 can be pre-compiled to create a corresponding native image. However, the assembly 1.0 can be updated to version 1.1. In such a situation, the native image corresponds to assembly version 1.0 and not the updated version 1.1. Native image validation ensures the native images correspond to the appropriate code and prevent out-of-sync native images.

Conventionally, native image validation is performed at runtime or in other words while executing code. At runtime, a native image is accessed (e.g., opened) to extract identifying information. Moreover, the assembly that the native image was created from, and other assemblies that that assembly references (i.e. depends on) may be accessed in order to extract identifying information. This conventional method of native image validation is a costly task in terms of system resources and time since it may involve opening multiple files on disk.

Details below are generally directed toward efficiently validating a native image with an assembly. More specifically, a portion of metadata (e.g., auxiliary file) can be created that includes identifying information during pre-compilation that generates the native image. This portion of metadata, or auxiliary file, includes a last modified timestamp (LMT) that can be used to check or validate a native image with an assembly without the costly task of opening the native image or managing the system registry. The metadata or auxiliary file can include additional information identifiers such as a module version identifier (MVID), a strong name hash, and a targeted patch band attribute.

Additionally, each information identifier can be employed to validate a native image in which each information identifier is validated in an increasing order of expense (e.g., processing time, memory, etc.).

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
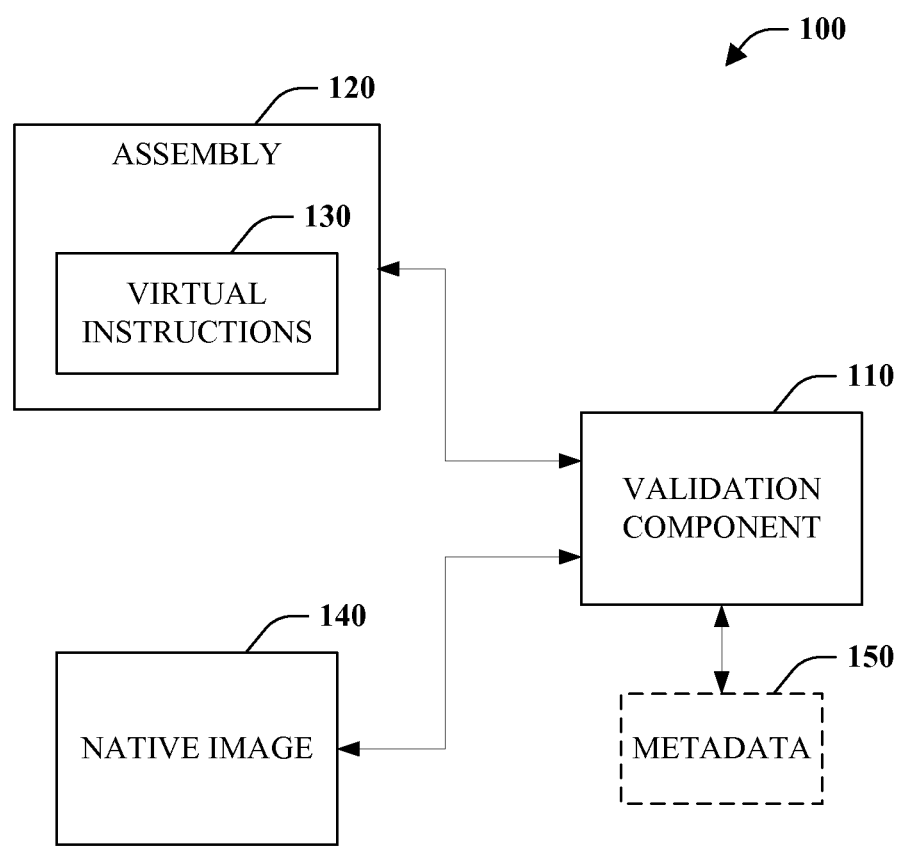
FIG. 1 is a block diagram of a native image validation system.

Referring initially to FIG. 1, a native image validation system 100 is illustrated. The system 100 can include a validation component 110 that is configured to validate a native image 140 (e.g., also referred to as a pre-compiled binary) with an assembly 120. The validation component 110 creates metadata 150 (e.g., also referred to as an auxiliary file) that includes an identifier utilized to validate the native image 140. As referred to herein, "validation" or "validate" can include any technique or mechanism that maintains assembly versions such that any native image within a virtual execution environment corresponds to an up-to-date or current assembly.

The assembly 120 can be any assembly or code that includes virtual instructions 130. As discussed herein, the assembly 120 can include managed code, unmanaged code, or a portion thereof that can include virtual instructions 130 or intermediate language code that can be pre-compiled or translated to create the native image 140 or pre-compiled binary for a particular execution on a particular machine. Moreover, it is to be appreciated that a computer can host any number of assemblies 120 associated virtual instructions 130, and corresponding native images 140. Stated differently, the assembly 120 can be a composition of code that includes more than one virtual instructions or more than one portion of intermediate language code which can be translated into a native image (e.g., pre-compiled binary) for employment on a host machine (e.g., a computer).

The validation component 110 generates a metadata 150 or a portion thereof that includes an identifier (also referred to as an "identifier information" or "fingerprint") that facilitates validation of the native image 140. In particular, the validation component 110 creates the metadata 150 during the generation of the native image 140. However, it is to be appreciated that the creation of the metadata 150 (e.g., auxiliary file, metadata stored in an auxiliary file, etc.) can be at any time proximate to the generation of the native image 140 (e.g., prior to pre-compilation of assembly, after native image generation, during translation of the native image, and/or any combination thereof). Furthermore, the validation component 110 can create the metadata 150 to include an identifier such as, but not limited to, a last modified timestamp (LMT), a module version identifier (MVID), a strong name hash, a targeted patch band attribute, among others.

The validation component 110 aggregates the identifier information into the metadata 150 (e.g., also referred to as auxiliary file) such that at least one identifier can be compared with the identifier information from the assembly 120 to ensure consistency. Stated differently, an identifier (e.g., a last modified timestamp (LMT), a module version identifier (MVID), a strong name hash, a targeted patch band attribute, etc.) for the assembly 120 (e.g., and/or a dependent assembly—an assembly that a primary assembly depends on) is collected to create metadata 150 (e.g., auxiliary file) for the native image 140 which is utilized to ensure the native image corresponds to an up-to-date assembly. This identifier information can reflect which assembly is tied or corresponds to the native image 140. Moreover, this identifier information facilitates validation of the native image 140 that can occur during runtime or a static engine command (e.g., command to pre-compile assembly to generate native image).

For example, an assembly version 1.0 can be installed on a machine in which a native image can be created (e.g., pre-compiled binary generated from the assembly version 1.0) there from. This native image will correspond to the assembly version 1.0. At a time proximate to the pre-compilation of the assembly version 1.0 to generate the native image, an auxiliary file can be created that includes identifiers such as, but not limited to, a last modified timestamp (LMT), a module version identifier (MVID), a strong name hash, a targeted patch band attribute, among others. These identifiers can be aggregated from the assembly version 1.0 such that the identifiers of the assembly version 1.0 match the identifiers stored within the auxiliary file for the native image. If a validation is performed for the native image (e.g., during runtime, a static engine command, etc.), the auxiliary file and included identifiers are compared to the corresponding assembly to ensure version consistency. In this example, if the identifiers within the auxiliary file match the identifiers with the assembly, the native image is valid. However, if the identifiers are inconsistent, the native image may be stale (e.g., the native image does not correspond to an up-to-date assembly). Stated differently, if the identifiers do not match, the assembly version 1.0 has changed (e.g., updated, newly installed, etc.) since the pre-compilation of the assembly version 1.0 to generate the native image.

Additionally, the validation component 110 can validate the native image 140 with a plurality of identifiers included with the metadata 150 or stored in an auxiliary file. In particular, the validation component 110 can employ a sequence or defined order in which to implement identifiers. For example, the validation component 110 can implement a validation sequence using multiple identifiers based upon an amount of system resources exhausted to perform such check or validation with each identifier. In a particular instance, the validation component 110 can utilize the identifiers in an increasing order of system resources (e.g., lowest amount of system resources for validation to most amount of system resources for validation). Such performance enhancements to the native image validation system 100 and validation component 110 are discussed in further detail below.

As discussed, it is to be appreciated that the metadata 150 or auxiliary file can include the last modified timestamp (LMT) for validation of the native image 140. The LMT can provide an efficient mechanism to validate the native image 140 with the assembly 120, for example. More specifically, an expensive file access (e.g., opening, looking up . . . ) need not be performed. Moreover, the metadata 150 or auxiliary file can be tightly coupled to the native image such that the native image is not accessed (e.g., opened) to utilize identifier information. Stated differently, the metadata 150 or auxiliary file can be stored proximate to the native image 140 to which the metadata 150 corresponds. These aspects and other embodiments are described in further detail below.

Figure 2:
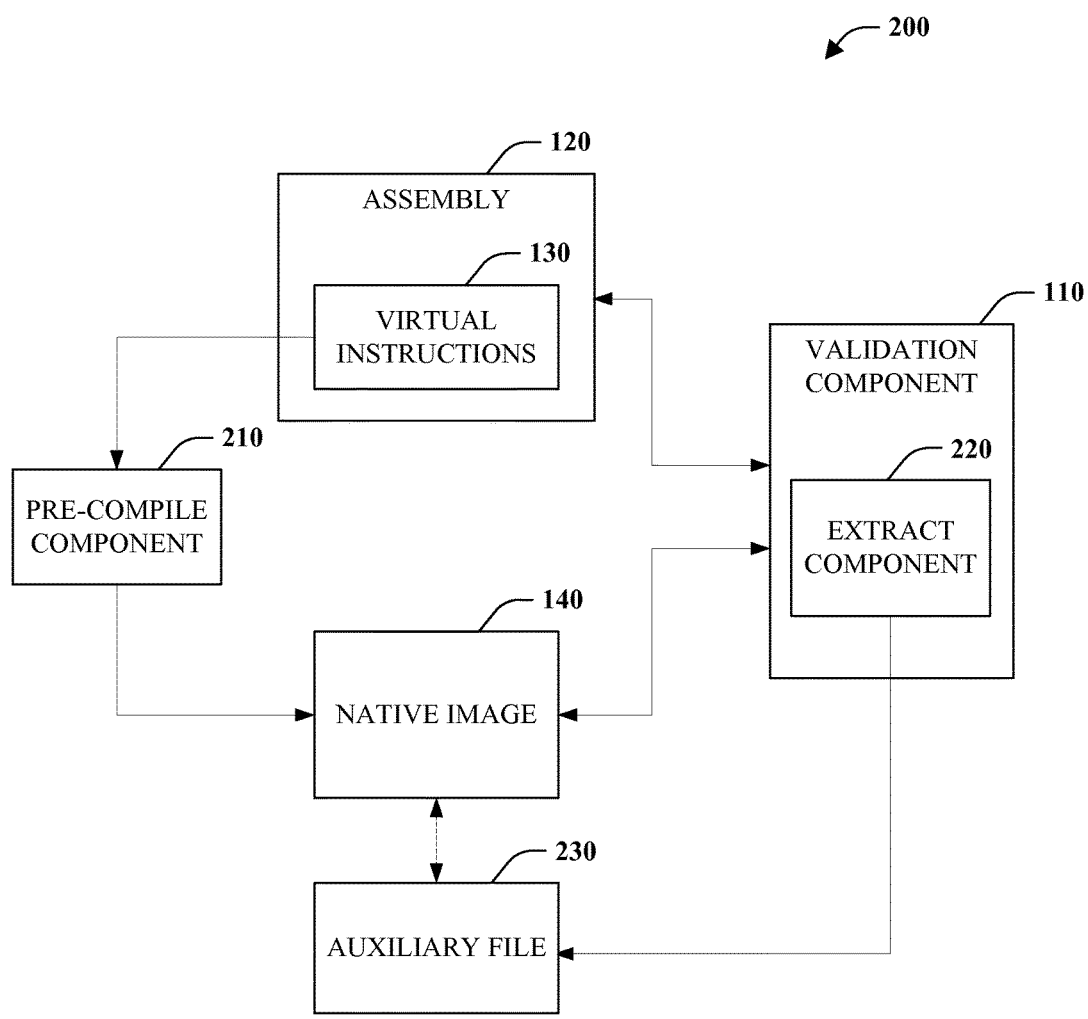
FIG. 2 is a block diagram of a native image metadata collection system.

FIG. 2 illustrates an exemplary native image metadata collection system 200. The native image metadata collection system 200 can include the validation component 110 that facilitates validating the native image 140. The assembly 120 can include one or more virtual instructions 130 that can be pre-compiled or translated by a pre-compile component 210. For instance, the pre-compile component 210 can be any engine or pre-compiler that translates the virtual instruction 130 or intermediate language code to operate on a host computer system. Stated differently, the pre-compile component 210 can be configured to translate the virtual instruction 130 into a native instruction or the native image 140 (e.g., also referred to as a pre-compiled binary).

The validation component 110 can further include an extract component 220 that is configured to aggregate identifiers in an auxiliary file 230 (also referred to as metadata 150 in FIG. 1 or metafile). It is to be appreciated that the extract component 220 can create the auxiliary file 230 at a time proximate to the pre-compilation or translation of the virtual instruction 130 that generates the native image 140. The auxiliary file 230 can include identifiers from the assembly 120 in order to distinguish which assembly the native image 140 is created from, among other things. For instance, the auxiliary file 230 can include relevant data from the full dependency set of assemblies for the native image 140.

By way of example and not limitation, the auxiliary file can include identifier(s) from a corresponding assembly for a native image as well as identifier(s) from any assembly that the primary assembly depends on. Thus, a native image that corresponds to a primary assembly may include a first assembly and a second assembly that the primary assembly depends on. In this example, the auxiliary file can include identifier(s) from the primary assembly, and the first and second assemblies it depends upon. Therefore, the subject innovation provides native image validation by accessing the auxiliary file rather than accessing multiple files (e.g., native image, primary assembly, dependencies of the primary assembly, etc.). It is to be appreciated that the subject disclosure is intended to include any auxiliary file with identifier(s) from any assembly (primary, dependent, any combination thereof).

More generally, identifiers in the auxiliary file can correspond to anything that influences the generated contents of the native image so as to ensure that none of these factors have changed between when the image was created and when it is being attempted to be used. For instance, the contents of a native image can rely on the assembly the native image corresponds to (e.g., assembly "A") as well as other assemblies (e.g., assembly "B"), and other native images (e.g., native image "2") that may be loaded during the creation of the native image, among other things. Consequently, a native image can be invalidated not just because assembly "A" was updated, but also because assembly "B" or native image "2" changed. It also follows that the use of the auxiliary file enables validation of the native image without accessing one or more native images or assemblies.

The identifier(s) can be a last modified timestamp (LMT), a module version identifier (MVID), a strong name hash, a targeted patch band attribute, among others. It is to be appreciated that the claimed subject matter is not limited to the above exemplary identifiers. Any suitable identifier capable of validating a native image can be employed.

As discussed, the extract component 220 can aggregate identifier(s) for the native image 140. Moreover, the extract component 220 can store these identifier(s) into the auxiliary file 230 such that the auxiliary file 230 is tightly coupled to the native image 140. In general, the auxiliary file 230 is stored in such a manner that the native image 140 and associated auxiliary file 230 are stored proximate to one another for quick access and association by the validation component 110. Moreover, the auxiliary file 230 includes at least one identifier in which the identifier is extracted from the corresponding assembly 120. It is to be appreciated and understood that the auxiliary file 230 can further include identifier(s) and/or metadata for at least one assembly dependent on the native image 140.

By way of example and not limitation, an assembly can be installed and a pre-compilation of code provided there by can result in a native image. An auxiliary file can be created in which a tight coupling exists between the file and the native image. Moreover, the auxiliary file can include identifiers copied from the assembly from which the native image was created. Also, the auxiliary file can include data from a set of dependent assemblies, or, in other words, assemblies on which a primary assembly depends. Thus, the identifiers in the auxiliary file (for a native image) match the identifiers of the assembly (from which the native image was translated). At a later point in time, the auxiliary file of a native image and identifiers of assemblies can be utilized for validation to ensure the native image matches with the most current or up-to-date assembly on the host machine.

It is to be appreciated that the validation component 110 and/or the extract component 220 can be coupled to or in direct communication with the pre-compile component 210 (not shown) in order to create the auxiliary file at a time proximate to the generation of the native image 140. Moreover, it is to be understood that the extract component 220 can aggregate any identifiers from the assembly 120 in order to create the auxiliary file 230 as well as identifier(s) from any assembly that the primary assembly depends on.

Figure 3:
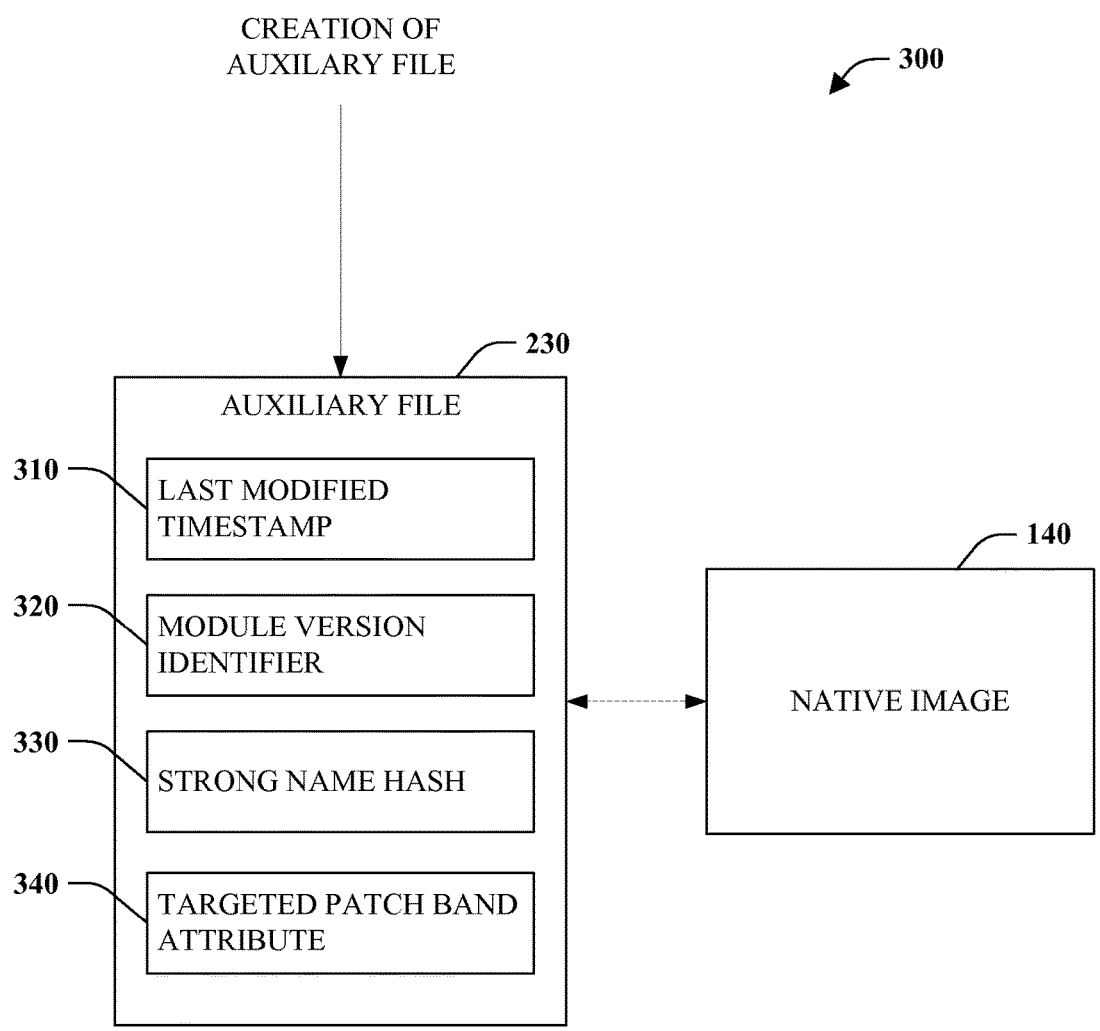
FIG. 3 depicts an exemplary generated auxiliary file schema.

FIG. 3 illustrates an exemplary generated auxiliary file schema 300. The auxiliary file schema 300 can be created by the validation component 110 (not shown), and in particular, the extract component 220 (not shown). As discussed above, the auxiliary file schema 300 is depicted with the auxiliary file 230 tightly coupled or linked to the native image 140. In particular, the coupling or linkage allows for a quick association of metadata or identifiers for a particular native image. Stated differently, the auxiliary file 230 is stored proximate to the native image 140. For instance, a native image can be stored or cached in a particular directory or repository upon generation from a pre-compiler, among others. The auxiliary file 230 can be stored in the same particular directory or repository in order to facilitate access for validation. Generally, the auxiliary file 230 is not stored in a system registry in order to maintain transferability to another system(s) (discussed in more detail in FIG. 4). However, it is to be appreciated that the auxiliary file 230 can be stored in a system registry, for example.

What follows are a number of identifiers associated with aspects of the subject disclosure as provided with respect to validating a native image for a virtual environment. Such identifiers are merely exemplary and provided to depict at least one embodiment of aspects of the disclosure. Of course, the subject disclosure is not intended to be limited to these identifiers provided and all identifiers that can achieve the same or similar result are included within this subject disclosure.

The auxiliary file 230 can include identifiers to maintain consistent and up-to-date native images. Moreover, it is to be appreciated that the auxiliary file 230 can include identifiers to any assembly that the primary assembly depends on (primary assembly and native image dependent on such assemblies). The auxiliary file 230 can include a last modified timestamp (LMT) 310. The auxiliary file 230 can include any time stamp associated with the assembly from which the native image is created such as, but not limited to, a created timestamp, an access timestamp, etc. However, the LMT 310 can be specifically utilized to ensure an up-to-date validation. The LMT 310 can be a file system generated attribute that reflects the last time a file (here, the assembly) was modified.

The auxiliary file 230 can further include a module version identifier (MVID) 320. The MVID 320 is computed each time a portion of code is compiled. For example, source code (e.g., file.csc) can be compiled (e.g., with a .NET compiler) to create an executable (e.g., file.exe). When the executable is compiled and created, an MVID is associated therewith. Additionally, if the executable is re-compiled and re-created, an updated MVID is as well.

Moreover, the auxiliary file 230 can include a strong name hash 330. Assemblies can be signed with a key value pair. A runtime component (discussed in FIG. 4) such as a Common Language Runtime (CLR), utilizes assemblies with a strong name hash particularly in that only the signed copy of such assembly is used. For instance, when creating a strong name assembly, contents of a signed file can be hashed down to an integer and this hash is stored as the strong name hash. The strong name hash 330 changes each time the file content changes.

The auxiliary file 230 can include a targeted patch band attribute 340 that is associated with .NET framework assemblies, for example. Generally, a publicly visible surface can be identified for an assembly. This publicly visible surface can be preserved and associated with an identification (ID). Each time the public surface changes (e.g., a revision of the assembly), a new ID is assigned. This ID is the targeted patch band attribute 340. The public surface can be monitored or tracked for changes or revisions in order to determine whether native images should be re-created for any other dependent assemblies. It is to be appreciated that a public surface can be any method, type, class, or field within an assembly that are marked public (e.g., keyword "public") or is not marked public but is needed by another native image (e.g., dependent on a public surface). In other words, the public interface can be considered changed (e.g., ID updated) when any method, type, class, or field marked "public" changes or any method, type, class, or field dependent on a public item.

In general, the auxiliary file schema 300 can be cached in a meta-file (e.g., metadata, auxiliary file) to enable native image validation that does not require opening assembly or native image files. Further, the auxiliary file 230 can include information about a mapping IL assembly (e.g., for soft bound dependencies and a current native image itself) and a mapping native image assembly (e.g., for hard bound dependencies), for example. A hard bound dependency can be the type of dependency of a native image that requires a native image at runtime, and the native image will be eagerly loaded when a parent assembly is loaded at runtime. The parent native image typically has hard references to methods/method-tables within its hard bound dependency's native image. A soft bound dependency can be the type of dependency of a native image that does not need to have a native image at runtime, and that will not be eagerly loaded when the parent assembly is loaded at runtime. The auxiliary file 230 can also include information about transitive closure of dependencies. The auxiliary file 230 can be generated when a native image file is created.

By way of example and not limitation, a proposed format of the auxiliary file can be as follows: [tag][length][datablob][tag][length][datablob] . . . . Where [tag] is a value chosen to indicate a kind of data (e.g. "timestamp of the parent image") and length verifies the file is complete and to potentially allow storing custom data. Examples of such fields can be assembly names, timestamps, MVID, strong name hash, etc. Furthermore, the auxiliary file 230 can store file paths for each assembly to support disambiguation for the cases where assemblies have identical or substantially similar file name, time-stamp but different contents and have different file paths.

Figure 4:
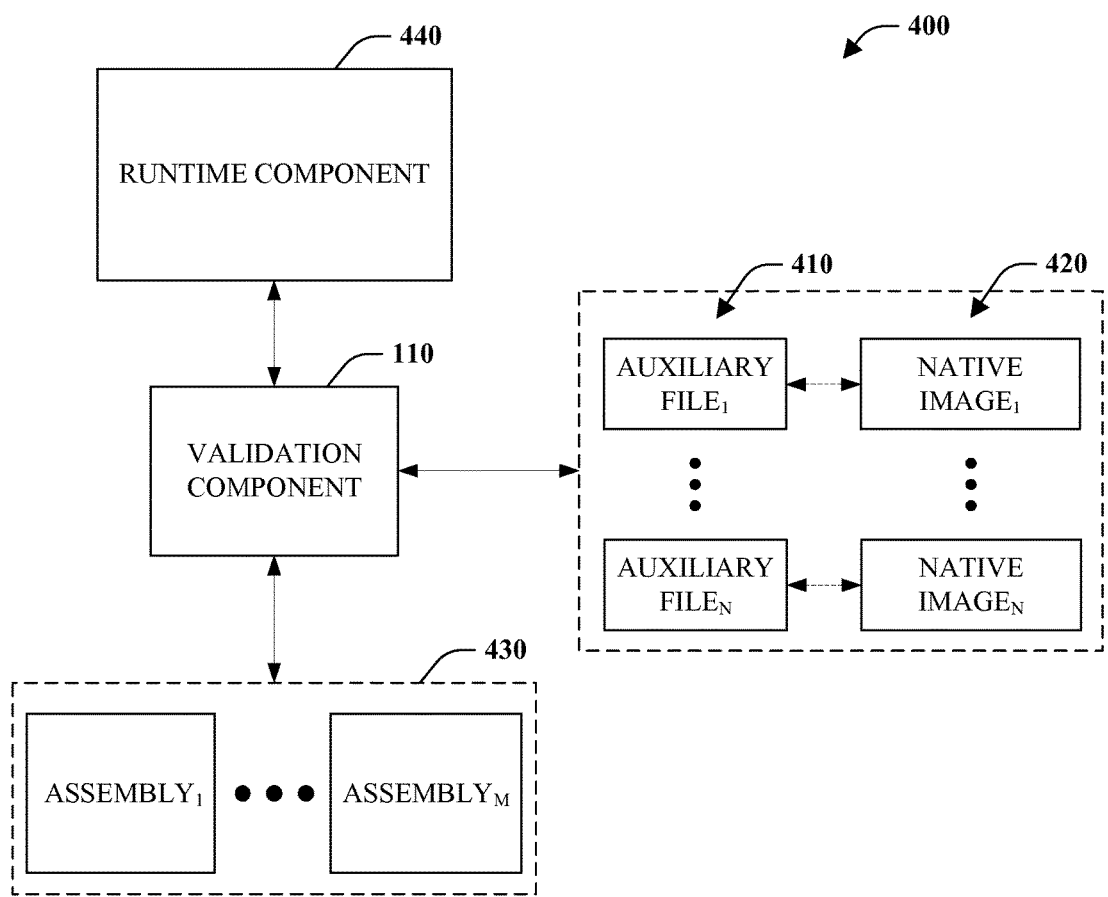
FIG. 4 is a block diagram of a validation system for native images.

FIG. 4 illustrates a validation system 400 for native images. The validation system 400 can include the validation component 110 that creates auxiliary files 410 for each native image 420. In particular, the validation component 110 can create auxiliary file$_1$ to auxiliary file$_N$ for native image$_1$ to native image$_N$, where "N" is a positive integer, wherein an auxiliary file is associated with a native image. As discussed, the auxiliary files 410 can be created at a time proximate to the generation of the native images 420, wherein the auxiliary files 410 are tightly coupled to each respective native image(s) 420.

By way of example and not limitation, the auxiliary files 410 can be stored independent of a system registry to facilitate transferability of files between systems. In particular, the validation system 400 can facilitate "xcopy" deployment such that a system registry is not used for storage of the auxiliary files 410. For instance, during an installation of an application or software, files are installed and content is written to a system registry. Thus, in addition to files stored in a select directory for the application or software, the system registry includes requisite files and information. In order for the application or software to execute properly, the stored files in the select directory as well as the system registry contents are required. However, an "xcopy" deployment refers to a deployment of an application or software that is not dependent on the system registry contents since the files stored in the select directory are only needed for proper execution. However, it is to be appreciated that the auxiliary files 410 can be stored and dependent on a system registry in another embodiment of the subject disclosure.

The validation component 110 can leverage the auxiliary files 410 in order to validate the native images 420. Specifically, identifiers included with the auxiliary files 410 can be compared to identifiers associated with corresponding assemblies 430. There can be any suitable number of assemblies from assembly$_1$ to assembly$_M$, where "M" is a positive integer. As mentioned above, an auxiliary file can be created to a time proximate to a generation of a native image (e.g., pre-compiled binary), wherein the native image is translated (e.g., pre-compiled) from a corresponding assembly. Upon creation of the auxiliary file, identifiers are included therewith in order to distinguish which assembly (and in particular, which version of the assembly) the native image was created from. Thus, identifiers of an auxiliary file for a native image should match identifiers of a corresponding assembly unless the assembly has been updated, installed, modified, among others. Additionally, an auxiliary file can include data regarding assemblies that depend on a primary assembly from which a native image was created in order to mitigate accessing multiple files during native image validation.

The validation system 400 can further include a runtime component 440 that is configured to locate and load a native image (e.g., pre-compiled binary). The runtime component 440 can be any suitable runtime engine or virtual environment engine such as, but not limited to, a Common Language Runtime (CLR). It is to be appreciated that the validation component 110 can be incorporated into the runtime component 440, a stand-alone component (as depicted), and/or any combination thereof.

As previously discussed, assemblies 430 can include virtual instructions that cannot be executed on a machine without translation to use architecture specific instructions (e.g., native code). This translation can be done by a pre-compile component (not shown) that generates a native image (e.g., pre-compiled binary) from a given assembly. Application execution can be performed by referencing the assembly (and not by referencing the native image directly) such that it falls to the runtime component 440 to locate and validate native image 420 for a requested assembly. The runtime component 440 can utilize the validation component 110 to ensure that a native image being loaded is associated with a current (e.g., up-to-date) copy of the assembly.

For example, an assembly (hello.exe) can have a dependency on an assembly (a.dll). The a.dll can be pre-compiled to create a native image (a.ni.dll) as well as an auxiliary file with identifiers. When a user runs hello.exe, the user requests the assembly. The runtime component 440 will locate and load the native image (a.ni.dll). Moreover, the runtime component 440 can validate the native image with the auxiliary file (via the validation component 110) at runtime.

Continuing with this example, the auxiliary file for the native image (a.ni.dll) can be employed for validation. Specifically, each identifier included with the auxiliary file can be compared to an identifier with the assembly (a.dll). Thus, a first identifier within the auxiliary file can be compared to a first identifier within the assembly, for each identifier included within the auxiliary file. In one embodiment, a first identifier is used and if validation fails, an additional identifier is used, and so on and so forth. As discussed in FIG. 5, a sequence or order of employing each identifier can be strategically selected.

It is to be appreciated that the validation component 110 can be implemented for validation with the runtime component 440 (as depicted) as well as with any pre-compilation of assembly to generate a native image. In other words, a static engine command to translate a virtual instruction (from assembly) for native image generation can invoke the validation component 110 for native image validation. In general, the validation component 110 can be employed for any native image validation at an execution of an assembly or a pre-compilation or translation of a virtual instruction within an assembly.

Figure 5:
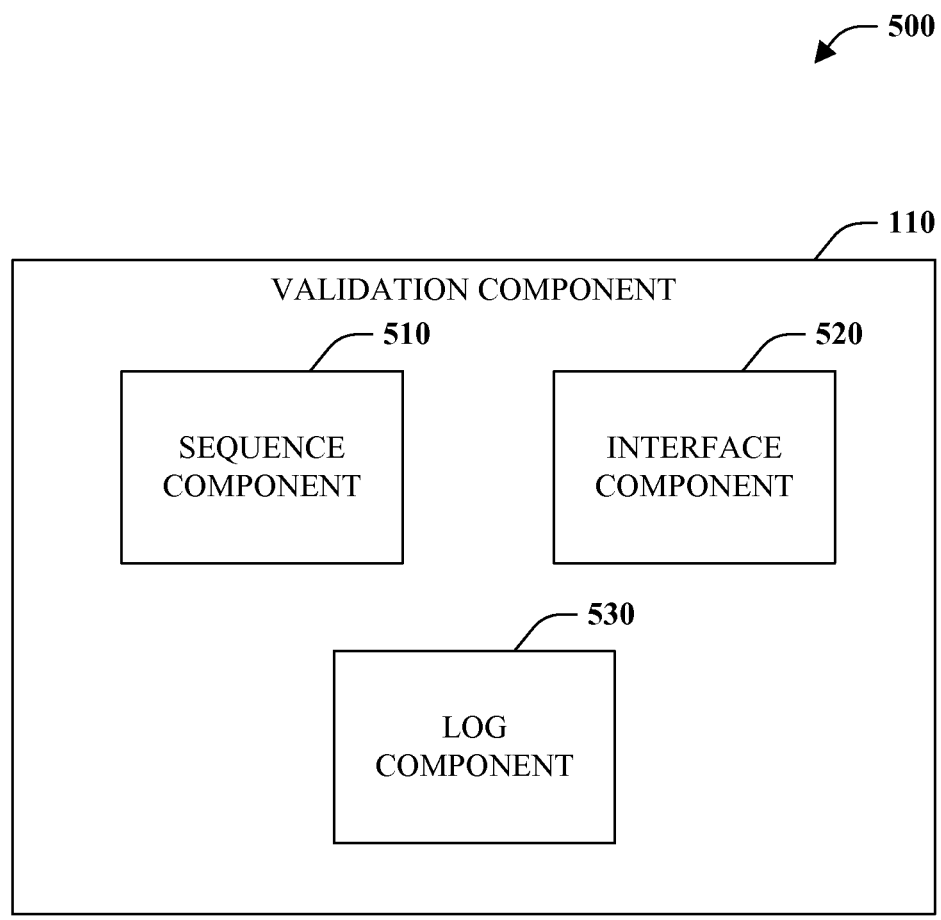
FIG. 5 is a block diagram of a system that facilitates identifying stale native images.

FIG. 5 illustrates a system 500 that facilitates identifying stale native images. The system 500 can include the validation component 110 that creates metadata or an auxiliary file (e.g., meta-file) for validating native images against assembly. The validation component 110 can further include a sequence component 510 that employs an order or sequence in which to use identifiers included with the auxiliary file. It is to be appreciated that the sequence can be user-defined, pre-defined, dynamically generated based upon assembly criteria (e.g., soft dependency, hard dependency, size, application importance, etc.), and/or any combination thereof. Furthermore, the identifier(s) can be, but are not limited to, an LMT, a MVID, a strong name hash, a targeted patch band attribute, among others.

In a particular embodiment, the sequence component 510 utilizes an order of identifiers for validation based upon how expensive the validation is in terms of system resources for each identifier. In other words, each validation with an identifier can have an associated system resource (e.g., memory, processing time, etc.) cost or expenditure, wherein native image validation is benefited and optimized by performing low cost identifiers prior to more expensive identifiers.

The following is an exemplary sequence for identifiers in order to validate a native image, wherein the exemplary sequence uses identifiers in an increasing order of resource costs (herein referred to as "increased cost order"). This order can be as follows: LMT; MVID; strong name hash; and targeted patch band attribute. It is to be appreciated that any suitable order or sequence can be applied to validate a native image and that any variation or change in order is to be included with the subject innovation. Moreover, as discussed above, the identifiers mentioned below is not an exhaustive list since any suitable identifier can be employed to validate a native image.

As mentioned, the auxiliary file can include identifiers LMT, MVID, strong name hash, and targeted patch band attribute. It is to be appreciated that for assemblies that include a strong name hash, the identifiers LMT, strong name hash, and targeted patch band attribute can be employed. Moreover, it is to be appreciated and understood that for assemblies that do not include a strong name hash, the identifiers LMT MVID, and targeted patch band attribute can be employed. Additionally, the identifiers corresponding to the native image are stored within the auxiliary file such that each identifier within the auxiliary file is compared to an identifier associated with the assembly.

A last modified timestamp (LMT) can be utilized as a first validation identifier. The validation component 110 does not need to open the assembly (not shown) to acquire the LMT for the assembly. The LMT stored in the auxiliary file can be compared against an LMT value found in the assembly. For example, the LMT value for the assembly can be provided by an operating system (OS), a file manager, a file system, among others. If the two LMT's match, the candidate native image is considered to be in-sync with the assembly requested and valid for loading. If the comparison failed, the validation component 110 can continue to validate with an additional identifier. Here, the validation component 110 continues to the MVID identifier based on the sequence component 510 using an "increased cost order."

The validation component 110 can perform the MVID check by opening the assembly to locate an MVID value, and compare this MVID value with the MVID value found in the auxiliary file. It is noted that this is a more resource costly validation since opening the assembly is performed. If the two MVID's match, the candidate native image is considered to be in-sync with the assembly requested and valid for use/loading. For instance, the native image can be considered valid because the LMT with a native image can change without the file contents themselves changing (e.g., moving the native image, copying the native image, etc.). If the comparison failed, the validation component 110 can continue to validate with an additional identifier. In this example, the validation component 110 can continue to the strong name hash identifier based upon the sequence component 510 using an "increased cost order."

The validation component 110 can employ the strong name hash identifier if the assembly is strong name signed. The validation component 110 can hash the contents of the assembly and compare this hash against the strong name hash stored in the auxiliary file. If the two strong name hashes match, the native image is considered to be in-sync with the assembly requested and valid for use/loading. If the comparison failed, the validation component 110 can continue to validate with an additional identifier. In this example, the validation component 110 can continue to the targeted patch band attribute based upon the sequence component 510 using an "increased cost order."

The validation component 110 can utilize the targeted patch band attribute identifier if the auxiliary file contains the targeted patch band identifier (e.g., fingerprint). The validation component 110 can assumed that the assembly contains the targeted patch band assembly level attribute based on the auxiliary file including such identifier. The assembly's metadata can be loaded in order to locate the value of the targeted patch band attribute (e.g., TargetPatch-Band). This value is compared against the targeted patch band attribute value stored in the auxiliary file. If the two targeted patch band attribute values match, the native image is considered to be in-sync with the assembly requested and valid for use/loading. If the comparison failed, the validation component 110 can continue to validate with an additional identifier. In this example, the validation component 110 can reject the candidate native image and continue to validate the next candidate native image. Note also that in this situation an execution environment can fall back to dynamic code generation by way of a just-in-time compiler.

The system 500 further includes an interface component 520 that is configured to generate output and receive input. In particular, the interface component 520 can be a user interface that allows the receipt of queries, commands, and the like. Moreover, the interface component 520 can generate notifications, query results, and validation information. In general, the interface component 520 can be an application programmable interface (API) that enables user interaction with the validation component 110 and any subcomponent thereof. For instance, a user can provide a query pertaining to the validation of a particular native image and receive a result for such query. In another example, a notification regarding valid or invalid native image detection can be communicated via the interface component 520 and a user can select whether to accept the valid native image and/or ignore the invalid native image. In still another example, a user can issue a command to view validation data collected.

The validation component 110 can include a log component 530 that is configured to collect validation data related to native images and corresponding assemblies. The log component 530 can track a result of a native image validation, and approximate reasoning behind such result. For example: native_image_a.dll was rejected because a native image could not be found for its hard bound dependency. The log component 530 can further track the identifier employed to validate the native image. For example: last modified timestamp (LMT) comparison was used to do native image binding. In general, the log component 530 can track and make available any data associated with the validation of a native image such as, but not limited to, auxiliary file contents for a native image, assembly identifiers, comparison results, resource consumption for validation with a particular identifier with a native image, among others.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the validation component 110 or one or more sub-components thereof can employ such mechanisms to efficiently determine or otherwise infer a frequency of how often a file changes in order to predict which native image is out-of-sync. Moreover, the validation component 110 or one or more sub-components thereof can employ such mechanisms to efficiently determine or otherwise infer a sequence to implement identifiers for validation based upon a type of assembly or code.

Figure 6:
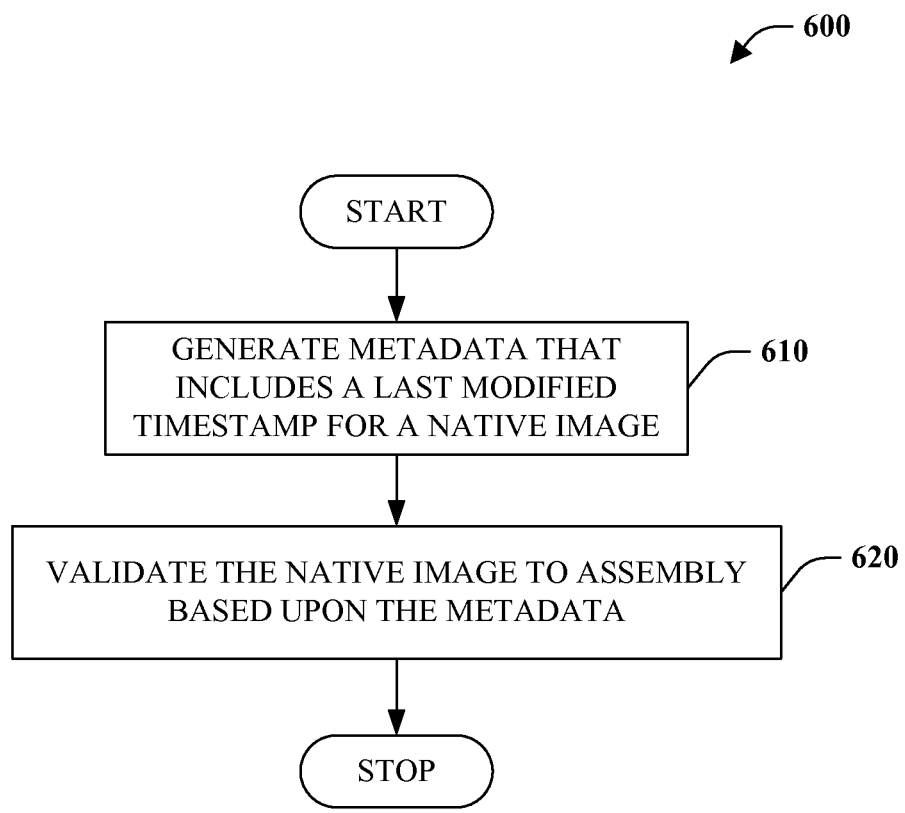
FIG. 6 is a flow chart diagram of a method of certifying a native image with an assembly.
Figure 7:
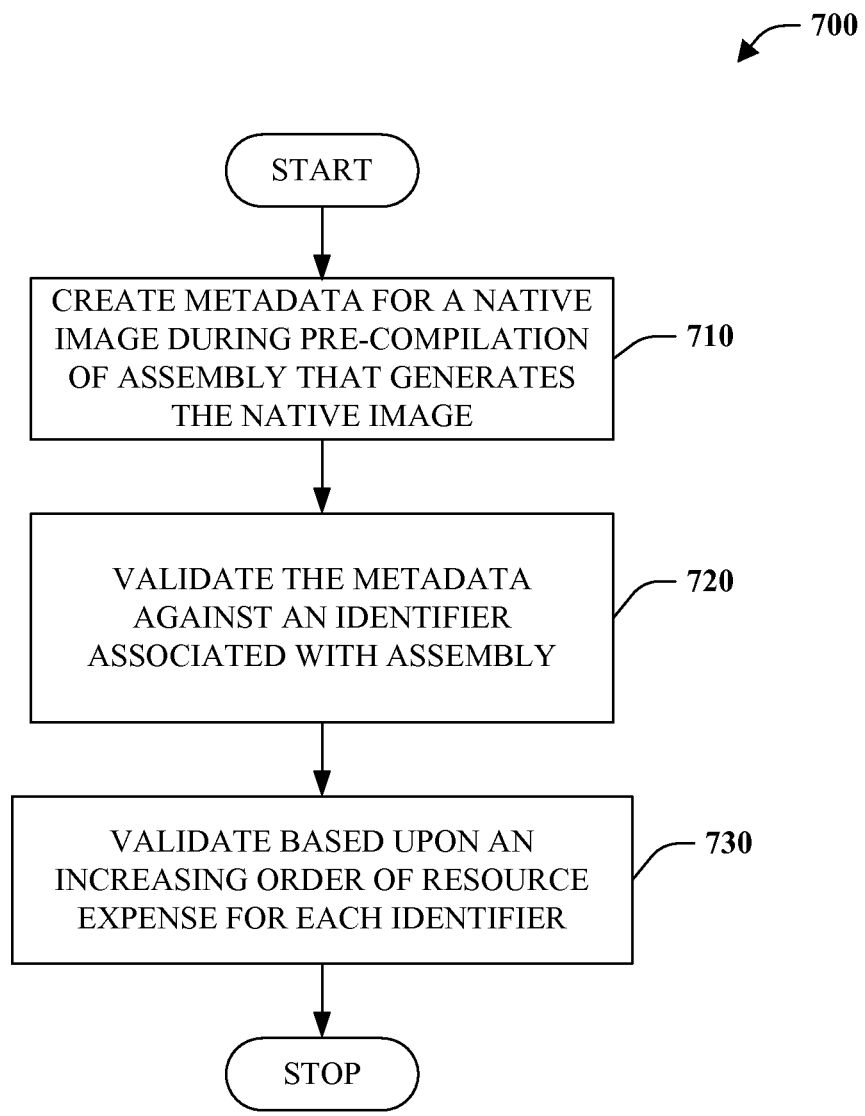
FIG. 7 is a flow chart diagram of a method creating metadata for a native image to maintain assembly consistency.
Figure 8:
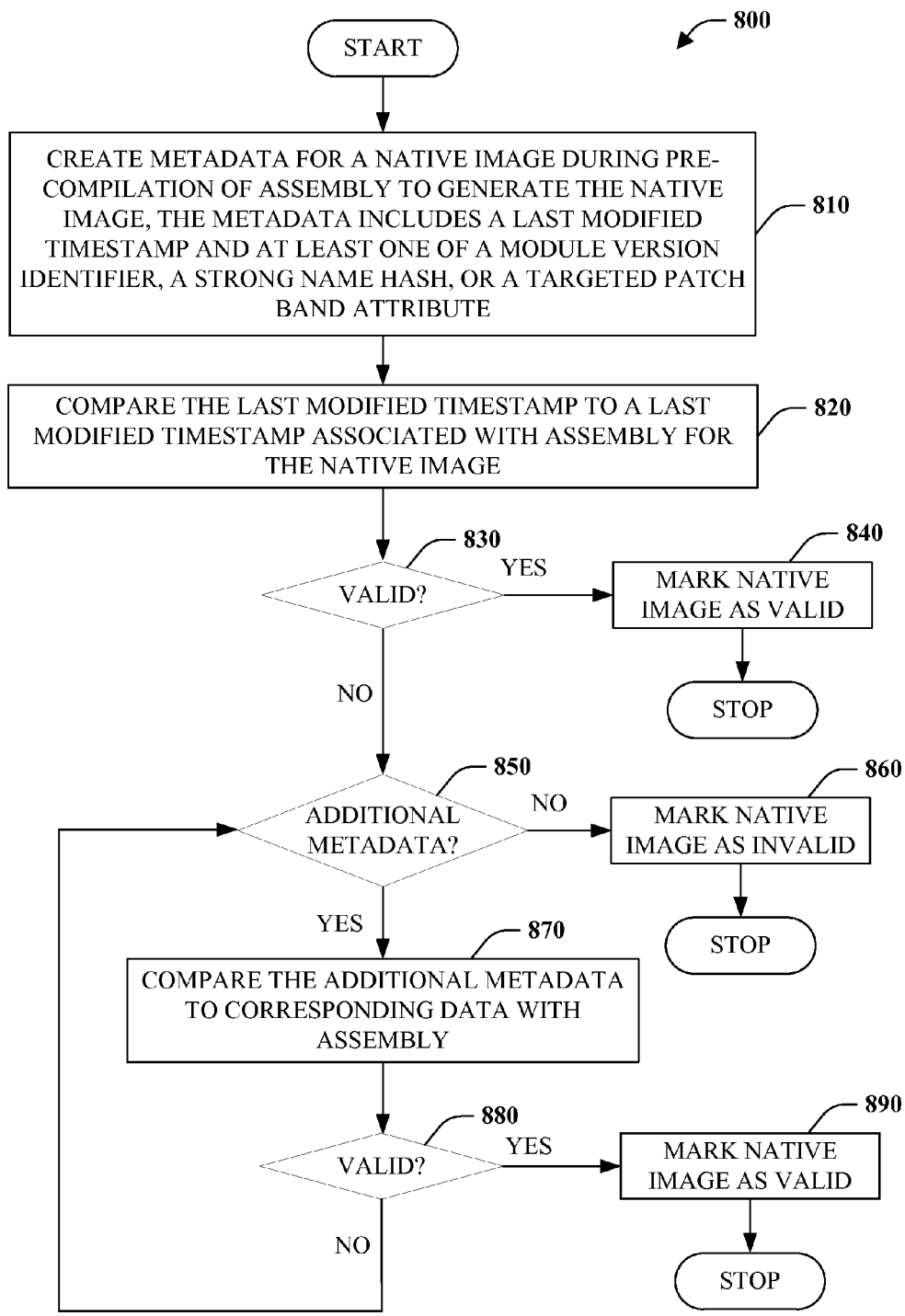
FIG. 8 is a flow chart diagram of a method validating native images with assemblies with metadata.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 is a flow chart diagram of a method 600 of validating a native image with an assembly. At reference numeral 610, metadata can be generated that includes a last modified timestamp (LMT) for a native image. Specifically, the metadata can be created as an auxiliary file during the pre-compilation of the assembly to generate the native image. The metadata, and in particular, the LMT can be the LMT of an assembly that corresponds to the native image generated there from.

At reference numeral 620, the native image can be validated to the assembly based upon the metadata. For instance, the metadata for the native image can be compared to corresponding data associated with the assembly. In particular, the LMT stored in the metadata upon creation of the native image can be compared with the LMT for the assembly. If the two LMT's match, the native image is considered to be in sync with the assembly. If the two LMT's do not match, the native image may be invalid. It is to be appreciated that additional metadata and identifier information can be employed as discussed above and below.

Referring to FIG. 7, a method 700 of creating metadata for a native image to maintain assembly consistency is illustrated. At reference numeral 710, metadata for a native image can be created during pre-compilation of assembly to generate the native image. Stated differently, an auxiliary file that is tightly coupled to a native image can be created proximate to a time of generating the native image. The auxiliary file or metadata can be tightly coupled to the native image such that included identifier(s) (e.g., last modified timestamp, module version identifier (MVID), strong name hash, targeted patch band attribute, etc.) can be accessed without opening or accessing the native image. It is to be appreciated and understood that the subject innovation can utilize any appropriate identifier(s) that can provide insight on whether a native image corresponds to an assembly (e.g., in-sync between a pre-compiled binary or native image and an originating assembly).

At reference numeral 720, the metadata can be validated against an identifier (e.g., also referred to as identifier information) associated with assembly. In other words, the native image and tightly coupled metadata can include at least one identifier that is compared to an identifier for a corresponding assembly. Based on the comparison, the native image can be validated in order to ensure the native image matches to the assembly.

At reference numeral 730, validation can be based upon an increasing order of resource expense for each identifier. For example, the metadata or auxiliary file can include three (3) identifiers in which validating a native image with each of the three (3) identifiers includes a respective time or resource expense. Based on an increasing order of resource expense (e.g., less expensive to more expensive), at least one of the three (3) identifiers can be employed to validate a native image with assembly. In one example, an order for validating with identifiers can be last modified timestamp (LMT), module version identifier (MVID), and targeted patch band attribute. In another example, an order for validating with identifiers can be last modified timestamp (LMT), strong name hash, and targeted patch band attribute.

FIG. 8 is a flow chart diagram of a method 800 of validating native images with assemblies with metadata. At reference numeral 810, metadata for a native image can be created during pre-compilation of assembly to generate the native image, wherein the metadata can include a last modified timestamp (LMT) and at least one of a module version identifier (MVID), a strong name hash, or a targeted patch band attribute. It is to be appreciated that any suitable identifier (e.g., identifier information) can be included with the metadata such that the identifier determines whether or not a version of a current assembly matches the assembly the native image was created from.

At reference numeral 820, the last modified timestamp (LMT) can be compared to a last modified timestamp (LMT) associated with assembly for the native image. Stated differently, the native image LMT identifier (e.g., created during pre-compilation of the assembly to create the native image) is compared to the LMT identifier of the assembly.

At reference numeral 830, a determination is made whether the native image is valid. If the native image is valid, the method 800 continues to reference numeral 840. At reference numeral 840, the native image can be marked as valid. Stated differently, if the LMT of the native image matches the LMT of the assembly, the native image is considered to be in-sync. If the native image is not valid, the method 800 continues to reference numeral 850. If a match is not identified, the assembly and the native image are out-of-sync. In other words, the native image is stale and the assembly from which the native image was pre-compiled is not as up-to-date as the current (e.g., existing) assembly.

At reference numeral 850, a determination is made to whether the native image includes additional metadata (e.g., module version identifier, strong name hash, targeted patch band attribute, among others). If there is no additional metadata, the method 800 continues to reference numeral 860, where the native image can be marked as invalid. It is to be appreciated that a notification can be communicated to the system or environment in order to ensure identification of the invalid native image and assembly. If there is additional metadata, the method 800 can continue to reference numeral 870.

At reference numeral 870, the additional metadata can be compared to corresponding data with assembly. For example, a strong name hash can be additional metadata of which a strong name hash of a corresponding assembly can be compared. It is to be appreciated and understood that the additional metadata can be any suitable data to which a native image can be matched with assembly in order to determine if synchronization exists.

At reference numeral 880, a determination is made whether or not the native image is valid. If the native image is valid, the method 800 continues at reference numeral 890, where the native image can be marked as valid. If the native image is not valid, the method 800 can continue to reference numeral 850, wherein a determination is made whether additional metadata exists to further validate the native image.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
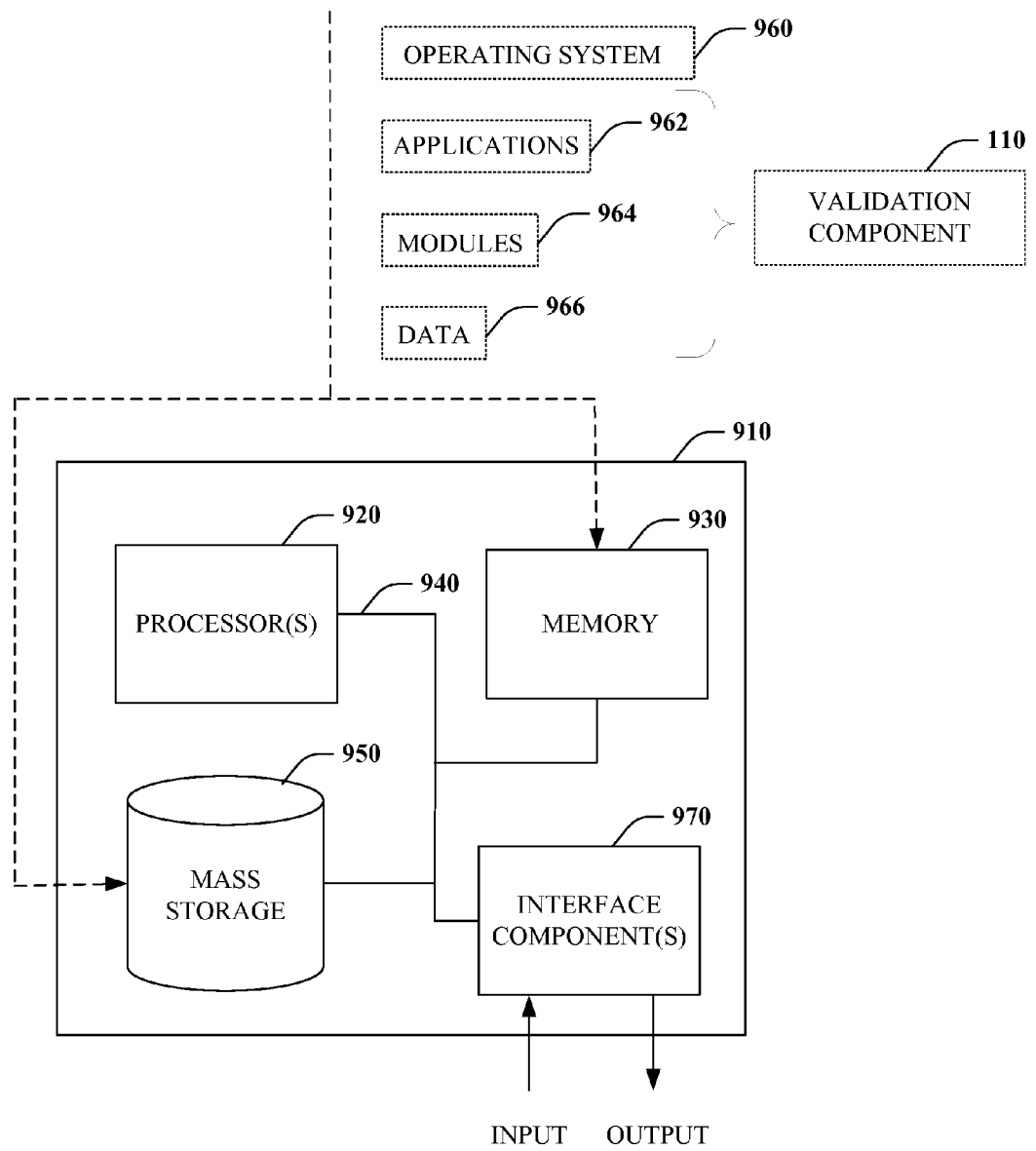
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 9, illustrated is an example general-purpose computer 910 or computing device (e.g., desktop, laptop, server, hand-held, programmable consumer or industrial electronics, set-top box, game system . . . ). The computer 910 includes one or more processor(s) 920, memory 930, system bus 940, mass storage 950, and one or more interface components 970. The system bus 940 communicatively couples at least the above system components. However, it is to be appreciated that in its simplest form the computer 910 can include one or more processors 920 coupled to memory 930 that execute various computer executable actions, instructions, and or components.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 910.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 930. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the validation component 110 can be, or form part, of an application 962, and include one or more modules 964 and data 966 stored in memory and/or mass storage 950 whose functionality can be realized when executed by one or more processor(s) 920, as shown.

In accordance with one particular embodiment, the processor(s) 920 can correspond to a system-on-a-chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the validation component 110, and/or associated functionality can be embedded within hardware in a SOC architecture.

The computer 910 also includes one or more interface components 970 that are communicatively coupled to the system bus 940 and facilitate interaction with the computer 910. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910 through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., CRT, LCD, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method comprising:
  employing at least one processor configured to execute computer-executable instructions stored in memory to perform the following acts:
  receiving metadata created during pre-compilation of intermediate language code of an assembly to a native image, wherein the metadata includes multiple identifiers that capture identifying information regarding the assembly from which the native image was produced and comprise one or more of a last modified timestamp, module version, strong name hash, or targeted patch band attribute;
  comparing a version of an assembly with the multiple identifiers sequentially, based on an increasing order of resource utilization to perform a comparison with a particular identifier, until the version of the assembly is determined to correspond to the native image based on one of the multiple identifiers or the comparing is performed with all of the multiple identifiers; and
  identifying the native image as valid when the version of the assembly is determined to correspond to the native image and otherwise identifying the native image as invalid.

2. The method of claim 1 further comprises comparing the version of the assembly with the multiple identifiers at runtime.

3. The method of claim 1, validating the native image further comprises receiving the metadata from a location proximate to the native image.

4. The method of claim 1 further comprises employing a common language runtime to compare the version of the assembly with the multiple identifiers.

5. The method of claim 1 further comprises comparing the version of an assembly with a subsequent identifier after comparison with a proceeding identifier fails in determining that the version of the assembly corresponds to the native image.

6. A system comprising:
  a hardware processor coupled to a memory, the hardware processor configured to execute computer-executable instructions stored in the memory that when executed perform the following acts:
  receives multiple validation identifiers from an auxiliary file created during pre-compilation of intermediate language code of an assembly to a native image, wherein the multiple validation identifiers capture identifying information regarding the assembly from which the native image was produced and comprise one or more of a last modified timestamp, a module version, a strong name hash, or a targeted patch band attribute;
  compares a version of an assembly with the multiple validation identifiers sequentially, based on an increasing order of resource utilization to perform a comparison with a particular validation identifier, until the version of the assembly is determined to correspond to the native image based on one of the multiple validation identifiers or the comparing is performed with all of the multiple validation identifiers; and
  identifies the native image as valid when the version of the assembly is determined to correspond to the native image and otherwise identifies the native image as invalid.

7. The system of claim 6, the auxiliary file includes the last modified timestamp and at least one of the module version, the strong name hash, or the targeted patch band attribute.

8. The system of claim 7 further comprises an instruction that when executed loads the native image at runtime if the native image is valid.

9. The system of claim 7 further comprises an instruction that when executed compares the last modified timestamp included with the auxiliary file with a last modified timestamp associated with the assembly to ascertain validity of the native image.

10. The system of claim 9, the last modified timestamp associated with the assembly is acquired by at least one of a file system or an operating system.

11. The system of claim 7, the last modified timestamp and the at least one of the module version, the strong name hash, or the targeted patch band attribute is located in the auxiliary file, proximate to the native image.

12. The system of claim 7, the increasing order of resource utilization is the last modified timestamp, the module version, and the targeted patch band attribute for the assembly that does not include a strong name hash.

13. The system of claim 7, the increasing order of resource utilization is the last modified timestamp, the strong name hash, and the targeted patch band attribute for the assembly that includes a strong name hash.

14. The system of claim 7, the assembly includes code with a plurality of virtual instructions that are translated to create the native image with native instructions executable by a host machine.

15. A computer-readable storage device having instructions stored thereon that upon execution of the instructions by at least one processor perform a method, the method comprising:

receiving multiple validation identifiers from an auxiliary file created during pre-compilation of intermediate language code of an assembly generating a native image, wherein the multiple validation identifiers capture identifying information regarding the assembly from which the native image was produced and comprise at least one of a last modified timestamp, module version, strong name hash, or targeted patch band attribute;

comparing a version of an assembly with the multiple validation identifiers sequentially, based on an increasing order of resource utilization to perform a comparison with a particular validation identifier, until the version of the assembly is determined to correspond to the native image based on one of the multiple validation identifiers or the comparing is performed with all of the multiple validation identifiers; and identifying the native image as valid when the version of the assembly is determined to correspond to the native image and otherwise identifying the native image as invalid.

16. The computer-readable storage device of claim 15, the method further comprises comparing the version of the assembly with the multiple validation identifiers in the following order: last modified timestamp, module version, strong name hash, and targeted patch band attribute.

17. The computer-readable storage device of claim 16, the method further comprises comparing the version of the assembly with a subsequent identifier after comparison with a proceeding identifier fails in determining that the version of the assembly corresponds to the native image.

* * * * *